(12) United States Patent
Baggenstoss

(10) Patent No.: US 8,200,489 B1
(45) Date of Patent: Jun. 12, 2012

(54) MULTI-RESOLUTION HIDDEN MARKOV MODEL USING CLASS SPECIFIC FEATURES

(75) Inventor: Paul M. Baggenstoss, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 566 days.

(21) Appl. No.: 12/322,960

(22) Filed: Jan. 29, 2009

(51) Int. Cl.
*G10L 15/00* (2006.01)
*G10L 15/06* (2006.01)

(52) U.S. Cl. .................... 704/243; 704/242; 704/255

(58) Field of Classification Search ................. 704/243, 704/254, 255, 256, 256.1, 242; 706/20
See application file for complete search history.

(56) References Cited

U.S. PATENT DOCUMENTS

| | | | | |
|---|---|---|---|---|
| 5,251,185 A * | 10/1993 | Baggenstoss | ................. | 367/100 |
| 5,555,317 A * | 9/1996 | Anderson | ..................... | 382/159 |
| 6,292,776 B1* | 9/2001 | Chengalvarayan | ........... | 704/219 |
| 6,466,908 B1* | 10/2002 | Baggenstoss | ................. | 704/256 |
| 6,535,641 B1* | 3/2003 | Baggenstoss | ................. | 382/228 |
| 6,789,070 B1* | 9/2004 | Willett et al. | .................... | 706/20 |
| 6,871,165 B2* | 3/2005 | Aggarwal | ..................... | 702/189 |
| 6,907,367 B2 | 6/2005 | Baggenstoss | | |
| 7,020,615 B2* | 3/2006 | Vafin et al. | ..................... | 704/500 |
| 7,269,556 B2* | 9/2007 | Kiss et al. | ..................... | 704/245 |
| 7,567,203 B2* | 7/2009 | Dizaji et al. | .................... | 342/90 |
| 2002/0120445 A1* | 8/2002 | Vafin et al. | .................... | 704/241 |
| 2003/0046036 A1* | 3/2003 | Baggenstoss | ................. | 702/189 |
| 2004/0260552 A1* | 12/2004 | Navratil et al. | ................ | 704/269 |
| 2005/0203877 A1* | 9/2005 | Baggenstoss | ..................... | 707/3 |
| 2007/0083365 A1* | 4/2007 | Shmunk | ........................ | 704/232 |
| 2009/0043575 A1* | 2/2009 | Thompson et al. | ........... | 704/230 |

OTHER PUBLICATIONS

Baggenstoss, "A Multi-Resolution Hidden Markov Model Using Class-Specific Features", IEEE Transactions on Signal Processing, Oct. 2010, vol. 58, Issue 10, pp. 5165 to 5177.*
Wang et al., "Class-Specific Segmentation of Time Series", 2003 IEEE Aerospace Conference, 2003 Proceedings, vol. 5, pp. 5-2085 to 5-2096.*
Beierholm et al., "Speech music discrimination using class-specific features", Proceedings of the 17th International Conference on Pattern Recognition, 2004. ICPR 2004, Aug. 23, 2004 to Aug. 26, 2004, vol. 2, pp. 379 to 382.*
Paul M. Baggenstoss, A Multi-Resolution Hidden Markov Model Using Class-Specific Features, EUSIPCO-2008 (Aug. 29, 2008).
Lawrence R. Rabiner, A Tutorial on Hidden Markov Models and Selected Applications in Speech Recognition, Technical paper, Feb. 1989, pp. 257-286, vol. 77, No. 2, Proceeding of the IEEE.

* cited by examiner

*Primary Examiner* — Martin Lerner
(74) *Attorney, Agent, or Firm* — James M. Kasischke; Michael P. Stanley; Jean-Paul A. Nasser

(57) ABSTRACT

A method for classifying data includes selecting an elemental size and features for the data that are representative of possible subclasses. Resolution widths are selected in conjunction with these features. Models associated with symbols are developed from these resolution widths and features. Data is compared with these models to give a likelihood that the model applies. The best model is determined and a signal is provided related to the symbol associated with the best model.

20 Claims, 5 Drawing Sheets

MULTI-RESOLUTION HIDDEN MARKOV MODEL USING CLASS SPECIFIC FEATURES

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

None.

BACKGROUND OF THE INVENTION (1) Field of the Invention

The present invention generally relates to a signal analysis method that uses class specific features and different size analysis windows for recognizing phenomena in the signal.

(2) Description of the Prior Art

Characterizing an input signal is a common problem in many fields. In sonar and radar, it is often desirable to separate natural sources from manmade sources. This method also has application with geological survey signals and non-time series signals such as images. It can be applied to any one dimensional signal.

In speech recognition, it is desirable to recognize phonemes so that speech can be converted into text. Rabiner in "A Tutorial on Hidden Markov Models and Selected Applications in Speech Recognition," Proceedings of IEEE, Vol. 77, No. 2, (February 1989) provides background teaching a method for voice recognition using hidden Markov models. Three common hidden Markov model problems are given. The first is computing the probability of a given observation sequence from the model. This measures the matching between the observed sequence and the model. The second problem is in choosing the best state sequence for a given model and observation sequence. The solution of this problem uncovers the sequence of symbols. The third problem is refining model parameters to maximize the probability that an observation is characterized by a model. Resolution of this problem optimizes the model parameters to best describe an observed sequence.

Because the naïve solution to computing observation sequence probability is numerically intensive, a well-known forward procedure has been developed for efficiently calculating the probability of a given observation sequence from the model. In this method, a forward probability vector is calculated for each time in the observational period. This is calculated from the state probabilities, the observational symbol probabilities and the state transition probabilities. The calculation greatly reduces the number of calculations by using the lattice structure of the hidden Markov model.

In a typical automatic speech recognition (ASR) system, such as that taught by Rabiner, the speech signal is divided into equal-sized segments, from which features (usually cepstral coefficients) are extracted. The probabilistic model is usually a Hidden Markov Model (HMM). The process of characterizing the data is divided into two separate stages. In the first stage, it is necessary to extract useful information from the raw input data in a compact form that is useable by automatic recognition algorithms. This usually means that the data is divided into segments, and information in the form of features is extracted from each segment. In the second stage, an algorithm, usually a probabilistic model such as a hidden Markov model, decides which type of signal is present in each segment, or combines segments to recognize signals spanning multiple segments.

One problem with such a two-stage approach is the necessity of making difficult compromises in the first (feature extraction) stage. The size of the segments and the type of features must be consistent, even if the potential signal types are not. In view of this, existing systems aren't very good at processing complex signals where the segment sizes vary.

A good example of a complex signal is human speech where a typical vowel is consistent over time-durations as long as 60 milliseconds and is rich in spectral detail, whereas a "T-burst", a component of the sound of the consonant "T", has a duration as short as a few milliseconds and has little spectral detail. In spite of this, a single segment size and feature extractor is used for both. The typical analysis window for human speech is about 30 milliseconds (effectively 16 milliseconds after applying a window function), which is a compromise. It can be regarded as a poor compromise because it is too long to observe the occurrence of the "T-burst" and too short to fully characterize the spectral detail of the vowel.

The reason that the compromise is needed at all is because of the way decisions are made between competing signal hypotheses. These decisions are primarily made using a common feature set. For example, in order to decide between signal type A and B, the system needs to first train itself on the patterns observed for signal types A and B at the output of a feature extractor. Then, in the testing phase, the pattern observed using exactly the same feature extractor is compared with the learned patterns for signal types A and B, and a decision is made. Prior to the introduction of the class-specific method (CSM), classical decision theory did not consider the problem of deciding between signal types when patterns were learned using different segment sizes and different features extractors for each signal type. This is unfortunate because the segment size and feature type that is best to characterize each signal type may differ. Accordingly, there is a need for a method that can use different features and segment sizes, yet at the same time make optimal statistical decisions.

Several techniques related the use of signal-dependent or class-dependent features for classification are taught in the prior art, yet only those methods related to the class-specific method or CSM, are general in nature, and derived from a theory rooted in the classical optimum Bayesian classifier. CSM is covered in U.S. Pat. No. 6,535,641, "Class-Specific Classifier", and augmented by the probability density function (PDF) projection theorem (PPT) which is disclosed in Baggenstoss, "The PDF Projection Theorem and the Class-Specific Method", IEEE Transactions on Signal Processing, Vol. 51, No. 3 (March 2003). The probability density function projection theorem eliminates the need for sufficient statistics and allows the use of class-dependent reference hypotheses, improving the performance of any classification system using class-dependent features. U.S. Pat. No. 6,466,908, entitled "System and Method for Training a Class-specific Hidden Markov Model Using a Modified Baum-Welch Algorithm" alleviates the need for a common feature set in a HMM.

SUMMARY OF THE INVENTION

Accordingly, there is provided a method for classifying data includes selecting an elemental size and features for the data that are representative of possible subclasses. Resolution widths are selected in conjunction with these features. Models associated with symbols are developed from these resolution widths and features. Data is compared with these models to give a likelihood that the model applies. The best model is determined and a signal is provided related to the symbol associated with the best model.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DETAIL DESCRIPTION OF THE INVENTION

The method of the current invention receives data and determines the most likely signal hypothesis or symbol based on the most probable multi-resolution hidden Markov model. The symbol can be a word or phoneme in speech recognition. Unlike prior art hidden Markov model analysis, this method uses a multi-resolution hidden Markov model which combines the outputs from a variety of analysis window resolutions and feature types into a probabilistic model.

A glossary of terms and symbols is provided below to avoid confusion.

TABLE 1

| Term | Symbol | Description |
| --- | --- | --- |
| elemental segment | $x_t$ | A uniform segment of raw data of length T samples starting at sample $1 + (t - 1)T$. The finest subdivision of data that is considered. |
| | t | Elemental segment index variable, takes values from 1 to N |
| | T | The base segmentation size (number of samples) of the elemental segments. |
| Analysis window | $x^K_t$ | Definition 1: A non-elemental segment of raw data of length KT samples starting at sample $1 + (t - 1)T$. Definition 2: The set of K elemental segments, contained in the analysis window. |
| Signal class | m | One of a set of M possible data phenomena (called a state in standard hidden Markov model analysis). |
| Analysis window set | $K_m$ | The set of analysis window sizes available to signal class m, in increments of elemental segment size of T samples. Example: $K_m = \{12,8,4\}$ |
| Entry flags | $E_m$ | Entry flags associated with the analysis window set $K_m$. Example $E_m = \{1,1,0\}$. |
| State partition | | A section of wait states in the expanded state trellis associated with a given signal class m and segment size k. |
| Wait state | w | A discrete state in the expanded state trellis used to count out the number of time steps in a partition. |

TABLE 1-continued

| Term | Symbol | Description |
| --- | --- | --- |
| Segment likelihood function | $L^K_{t,m}$ | Equal to $\log p(x^K_t|m)$ |

Figure 1:
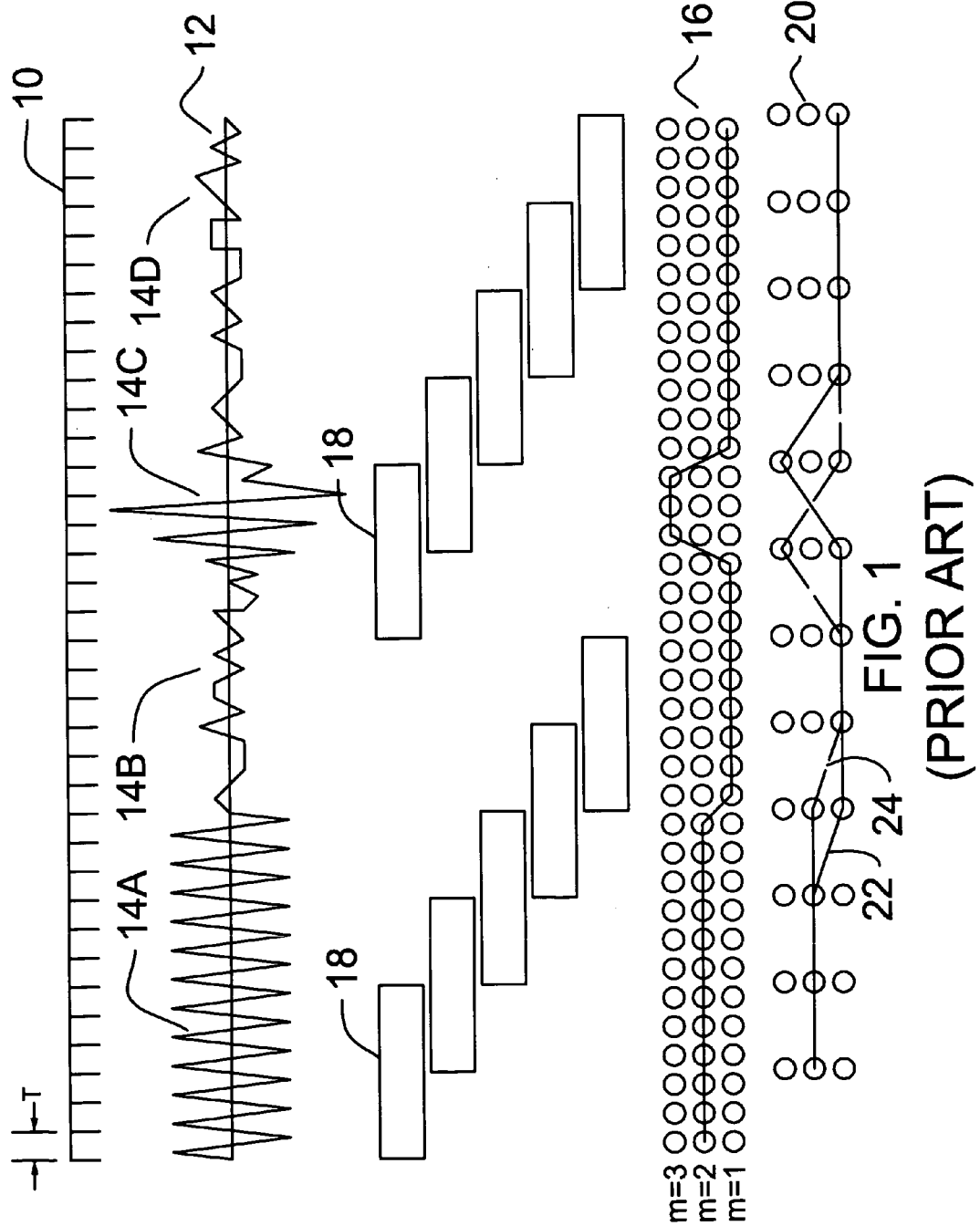
FIG. 1 is a diagram of a signal and segmentation using a standard HMM as known in the prior art.

For background purposes and to aid in the discussion, FIG. 1 shows the standard hidden Markov model (HMM) which uses uniform segmentation of the time-series and common feature set. In a standard HMM, a time-series signal is segmented for processing using a pre-determined uniform segmentation with overlap, and a common set of features is extracted from the segments. The underlying assumption is that the signal may be in one of M possible states, and that the state of the signal, which we are not able to observe directly, changes at increments of time co-incident with the centers of the overlapped segments.

FIG. 1 illustrates the main features of a standard HMM. On the very top is shown a time scale 10 in divisions of T samples. All objects in the FIG. are measured in units of T samples. Below the time scale is an illustration of an input signal 12. It is assumed that the input signal 12 can be in any one of M possible states (called signal subclasses) indexed by the integer m, and that the signal subclass must change at intervals of time coincident with the centers of the overlapped segments (3T samples in the figure). In the illustration, we show M=3 possible signal classes: noise (m=1), sine wave (m=2) and noise burst (m=3). A region of the input signal of class m=2 is indicated at 14A. A noise region (m=1) is indicated at 14B. A noise burst region (m=3) is indicated at 14C, and another noise region (m=1) is indicated at 14D. Near the bottom of the FIG., we see the actual state transitions occurring at a period of 3T samples indicated by the path through a state trellis 16. The actual state transitions are hidden—the observer is only able to see the input data. For this reason, the system is called a hidden Markov model.

Also in the FIG. are seen a set of processing windows 18 shown as rectangles. The rectangles 18 illustrate how each processing window is aligned to the input time-series 12. In the standard HMM, feature are extracted from each processing window 18 from the segment of input data 12 that is aligned with each window 18. The features from each processing window 18 are assumed to represent the characteristics of the input data 12 at a time coincident with the center of the processing window. As is the usual practice, the processing windows 18 are shifted in such a way that there is a certain amount of overlap between adjacent windows 18. In the FIG., there is a 50 percent overlap. The use of overlapping windows 18 is in part to improve the chance that events observed in the data will be aligned with at least one processing window 18.

In FIG. 1 at the very bottom, there is a standard HMM state trellis 20. In trellis 20, we see two potential state transition paths (solid 22 and dotted 24). Paths 22 and 24 represent possible paths that could be guessed from the observations. Note that the time resolution of the potential paths 22 and 24 agrees with the time resolution afforded by the shifted processing windows 18. We can see here the compromise that is made necessary by the standard HMM. If the processing windows 18 are too large, the ability to observe short events (such as the noise burst 14C) and fast changes in system state is diminished. Even with a reduction in shifting and an increase in overlap, the ability of the standard HMM to observe fast changes in system state is not improved. If the processing windows 18 are too short, the feature extraction necessary to optimally detect long events such as a weak sine wave is diminished.

Figure 2:
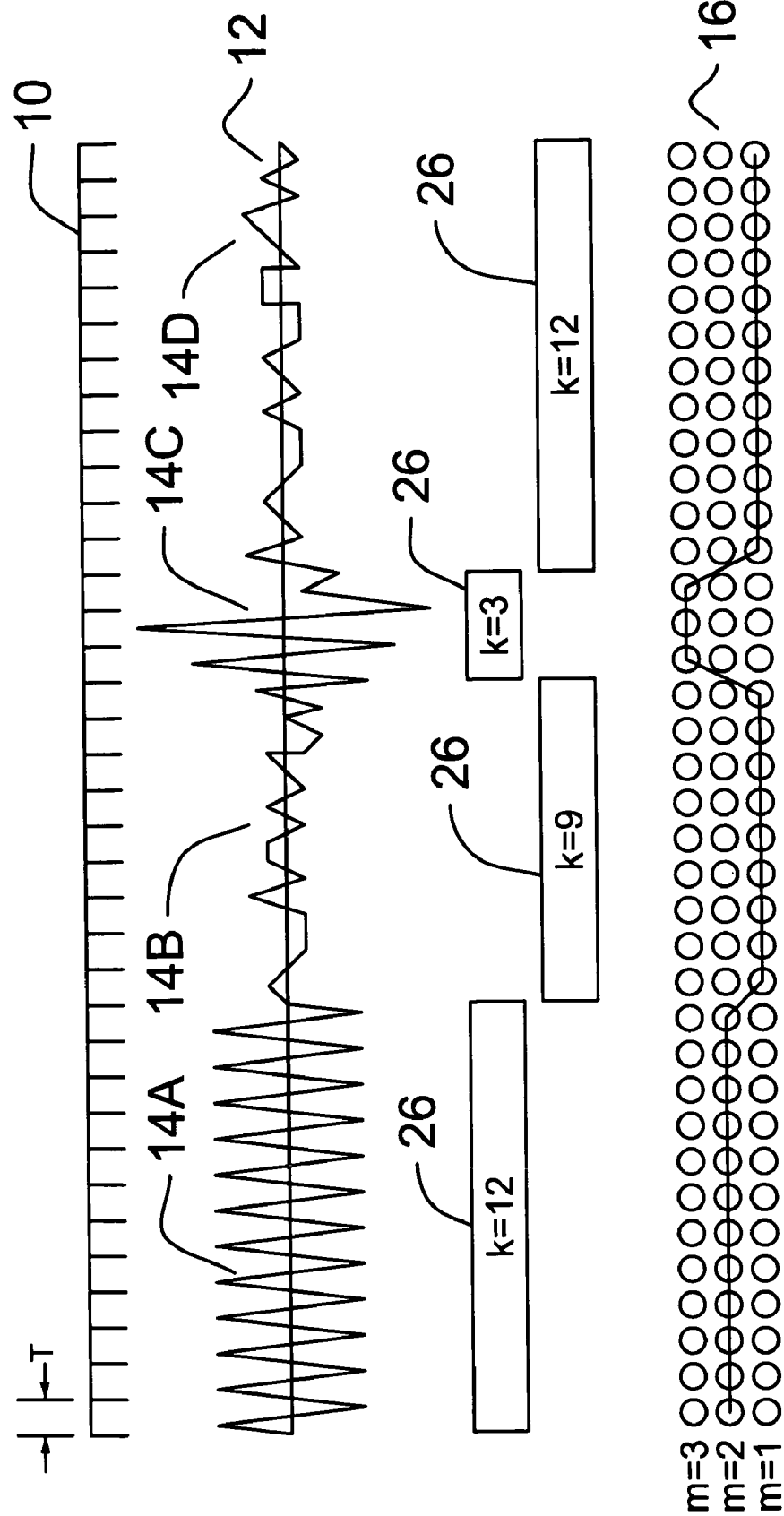
FIG. 2 is a diagram of a signal and an ideal segmentation.

Now referring to FIG. 2, a representation of the ideal situation, the available processing windows 26 are aligned with the events in the data. Unfortunately, the ideal set of processing windows 26 can be created only if we know the actual state transitions. Trying every possible combination of processing windows 26 is infeasible because this would involve computing every window size at every shift and testing all combinations. Accordingly, it is necessary to somewhat reduce the number of potential window sizes.

Figure 3:
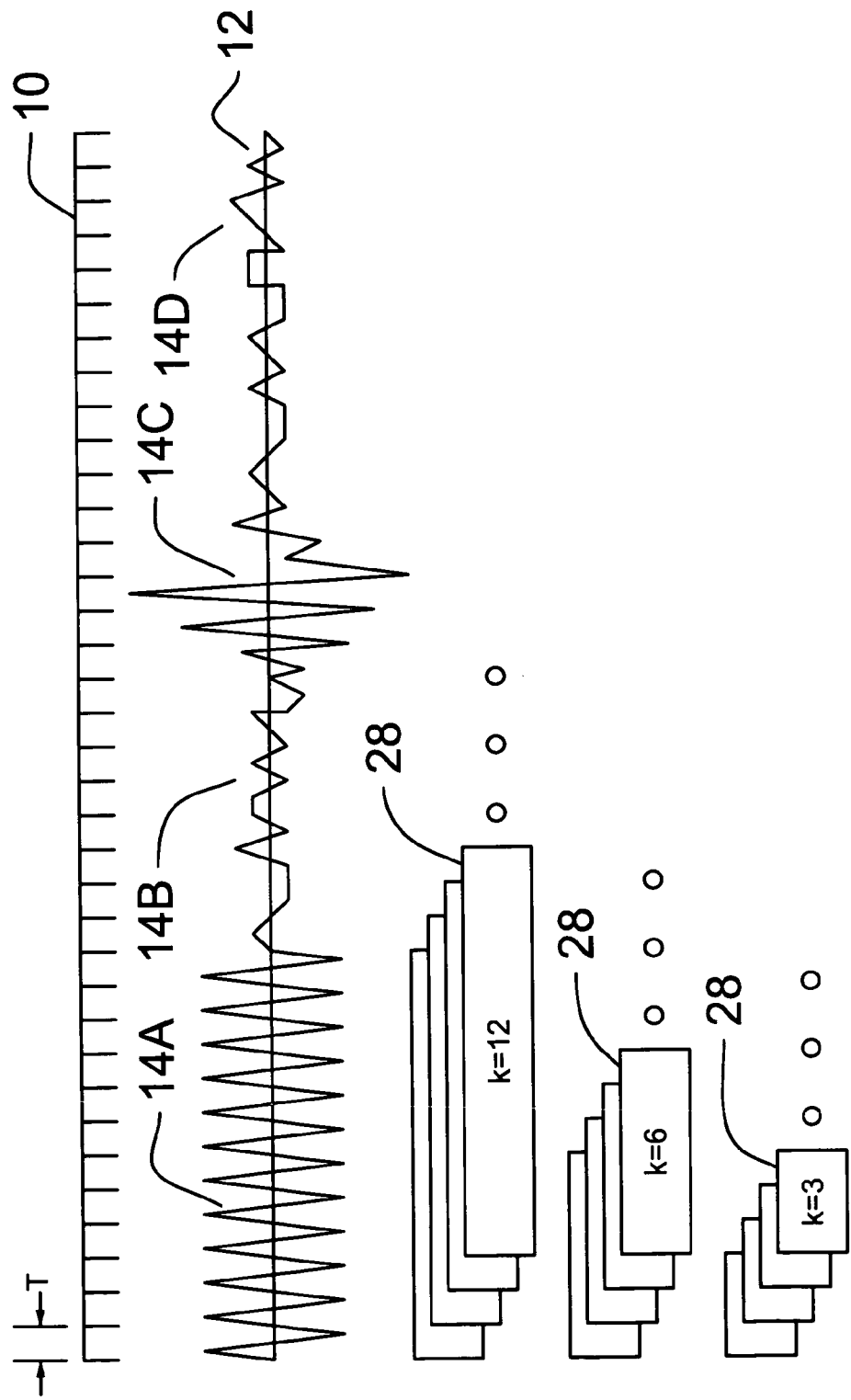
FIG. 3 is a diagram of a signal and the processing windows of an embodiment of the invention.

FIG. 3 illustrates the use of a reduced set of processing windows 28, with sizes indicated by the integer k which is the number of T-sample time steps. The reduced set of windows 28 includes windows sized at k=3, k=6, and k=12. These windows 28 are shown shifted at each time increment, T.

Figure 4:
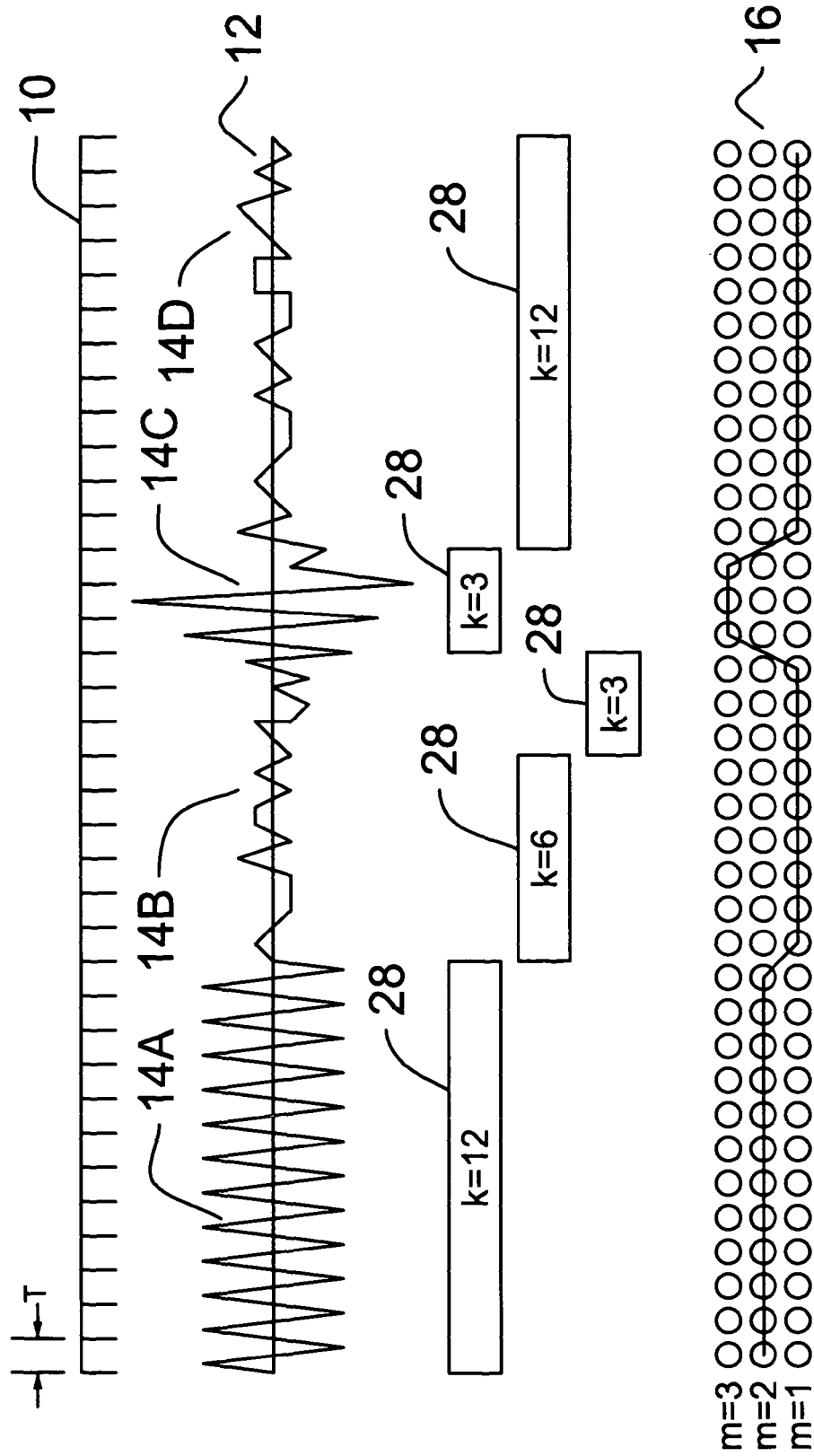
FIG. 4 is a diagram of a signal showing a sub-optimal segmentation.

In FIG. 4, we show one of the segmentations possible by selecting processing windows 28 available in FIG. 3. Because of the reduced set of windows 28, the noise segment of duration k=9 (region 14B) needs to be represented by a combination of windows 28 having length k=3 and k=6, which is a good compromise.

Note that the amount of processing is still large because even very large processing windows need to be calculated at every shift, which is highly redundant. Note, however, that efficient processing can be used to take advantage of the redundancy. Efficient processing of this type has been described in U.S. Pat. No. 6,907,367, entitled "Time Series Segmentation". We note that even if the processing problem can be solved, there are still two problems remaining. First, there is the issue of searching the enormous space of all possible segmentations of the input data. Second, there is the problem of comparing competing segmentations when the features are extracted from different segment sizes and potentially different feature types. This issue does not occur in the standard HMM because all segment sizes are the same and the same features are extracted from the segments, so simple likelihood comparisons are possible. We now describe how an embodiment of the multi-resolution hidden Markov model (MRHMM) is able to solve both of these problems and do it efficiently.

The MRHMM can be described as resulting from a sequence of three modifications of the HMM. In the first modification, we employ the probability density function projection theorem (PPT) to convert from using feature likelihood functions to raw (input) data likelihood functions. By comparing raw data likelihood functions, we are able to compare competing segmentations fairly. In the second modification, we constrain the dwell times of each system state. We do this by expanding the state trellis to include "wait states" that count out prescribed number of time steps. Once the system enters a given state, it must remain in that state for a fixed number of time steps before it can exit. In the third modification, we utilize "partial PDF" values so that the likelihood values are referred to time steps at the system resolution of T samples. In addition to the three primary modifications, there are a number of improvements including efficient implementation and minimum description length (MDL) compensation.

According to the first modification, we employ the PPT to operate in the raw data domain. This allows us to compare the raw data likelihood functions for two potential segmentations. Let q represent a potential segmentation and signal subclass assignment. In other words, q defines not only the length and positions of the segments, but the signal subclass present in each segment. The segmentation in FIG. 4 will serve as an illustrative example. The raw data likelihood function given the segmentation q in FIG. 4 is $$L(X|q) = \log p(x_1^{12}|m=2) + \log p(x_{13}^6|m=1) + \log p(x_{19}^3|m=1) + \log p(x_{22}^3|m=3) + \log p(x_{25}^{12}|m=1) = L_{1,2}^{12} + L_{13,1}^6 + L_{19,1}^3 + L_{22,3}^3 + L_{25,1}^{12} \quad (1)$$

where X is the entire input time series, and $x_t^K$ is the data segment of length K time steps starting at the t-th time step. Note that the total likelihood function given the segmentation equals the sum of the individual segment likelihood functions, which is denoted by $L_{t,m}^K = \log p(x_t^K|m)$, and is due to the assumption of conditional independence of the segments.

By applying the PDF projection theorem (PPT) we are able to calculate $L_{t,m}^K$ from the feature likelihood functions. Accordingly, it is assumed that a different feature extractor is available to characterize each signal subclass. Let $z_{t,m}^K$ be the feature vector extracted from segment $x_t^K$ using the feature extractor designed for signal subclass m. Using results from Baggenstoss, The PDF Projection Theorem and the Class-Specific Method, IEEE Transactions on Signal Processing, Vol. 51, No. 3 (March 2003), we can write:

$$p(x_t^K | m) = \frac{p(x_t^K | H_{0,m})}{p(z_{t,m}^K | H_{0,m})} p(z_{t,m}^K | m), \quad (2)$$

where $H_{0,m}$ is a reference hypothesis for which the PDF of both $x_t^K$ and $z_{t,m}^K$ are known exactly. The reference hypothesis is often a simple assumption such as independent Gaussian noise; however, it can be a function of the signal subclass m, if desired. The PPT assures that $p(x_t^K|m)$ so defined is indeed a PDF (it integrates to 1) and is a member of the subclass of PDFs that give rise to the PDF $p(z_{t,m}^K|m)$. Because the term $$J^m(x_t^K) = \frac{p(x_t^K | H_{0,m})}{p(z_{t,m}^K | H_{0,m})} \quad (3)$$

is obtained by mathematical analysis of the feature transformation connecting $x_t^K$ and $z_{t,m}^K$, it does not need to be learned, and thus is not affected by concerns of dimensionality.

Figure 5:
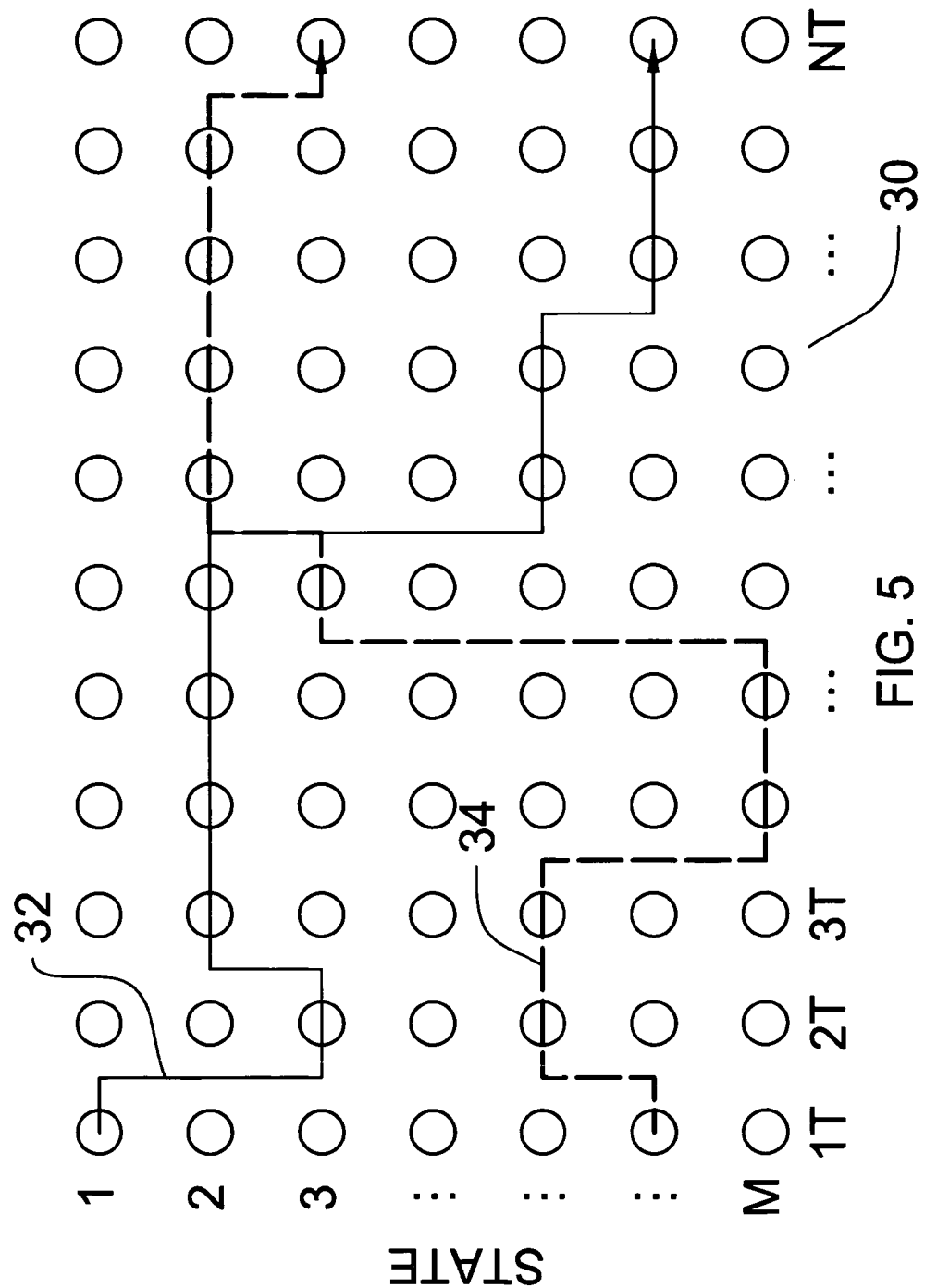
FIG. 5 is a diagram of a state trellis having wait states.

The second modification involves constraining state transitions to account for states of longer duration. FIG. 5 shows an example state trellis 30. State trellis 30 has M states at NT times represented by circles. A first path 32 and a second path 34 are shown through state trellis 30. In this model, it is required that whenever entering state 2, the state must remain in state 2 for 4 time steps (4T samples) before having the opportunity to transition. This constraint may be imposed by expanding the set of states to include "wait" states and using a structured state transition matrix. In the matrix below, associated with FIG. 5, the value at a position represents the probability of transition into that state. "1" is a certainty, "0" is an impossibility, and "X" a probability between a certainty and impossibility.

$$A^e = \begin{bmatrix} X & X & 0 & 0 & 0 & X & X & X & X & X \\ 0 & 0 & 1 & 0 & 0 & 0 & 0 & 0 & 0 & 0 \\ 0 & 0 & 0 & 1 & 0 & 0 & 0 & 0 & 0 & 0 \\ 0 & 0 & 0 & 0 & 1 & 0 & 0 & 0 & 0 & 0 \\ X & X & 0 & 0 & 0 & X & X & X & X & X \\ X & X & 0 & 0 & 0 & X & X & X & X & X \\ X & X & 0 & 0 & 0 & X & X & X & X & X \\ X & X & 0 & 0 & 0 & X & X & X & X & X \\ X & X & 0 & 0 & 0 & X & X & X & X & X \\ X & X & 0 & 0 & 0 & X & X & X & X & X \end{bmatrix} \quad (4)$$

The matrix is denoted by $A^e$ where the superscript "e" means the states are "expanded" to include wait states. In the above example, the wait states take discrete values from w=1 through w=10. Notice that wait states w=2 through w=5 have been partitioned off as they are all associated with the same signal subclass and segment length. Note also that it is only possible: to enter the partition through wait state w=2. From wait state w=2, it is forced to progress through wait states w=3, w=4, then w=5, at which time it is allowed to transition to another state partition. In the above example, only one state has been expanded. In the manner described above, a partition can be created for each combination of signal subclass and segment length. The size of the partition equals the segment length.

A potential source of confusion exists for the concept "state" because in the MRHMM there are three potential meanings of state (subclass, partition, wait state), while in the HMM there is but one. In the HMM, the concept of "state" is synonymous with signal subclass. In the MRHMM, each signal subclass is associated with more than one state partition, each with a different duration constraint as defined by the size of the wait state partition.

The dwell-time constraints of a given signal subclass m are represented by the set $K_m$. For example if $K_m=\{12,8,4\}$, signal subclass m is associated with wait-state partitions of size k=12, k=8, and k=4. This also means that the processing windows of sizes 12, 8, and 4 (times T samples) are available for signal subclass m. In addition to constraining the size of the available segments, we can also control the starting segment size. Corresponding to set $K_m$ is the entry flag, for example, $E_m=\{1,1,0\}$. This indicates that signal subclass m is allowed to begin with a segment size of 12 or 8, but not 4. This effectively sets a minimum length of the dwell time in signal subclass m. The total dwell time, thus has a minimum of 8 time steps (8T samples), and the full length of stay in signal subclass m must be composed of segments selected from the set k=12, 8 and 4.

For the situation shown in FIG. 4, the following constraints are proposed:

TABLE 2

| Class | Name | K | E |
|---|---|---|---|
| 1 | Noise | 12,6,3 | 1,1,0 |
| 2 | Sine Wave | 12,6 | 1,0 |
| 3 | Noise Burst | 3 | 1 |

The third modification required for a MRHMM is referencing likelihood values to the base time resolution of T samples. In effect, we "pretend" that a uniform segmentation of T samples was used so we need a likelihood value for each T-sample segment for a given segmentation. For a segment of K time steps, we assume that the log-likelihood in each time step is 1/K times the log-likelihood of the length-K segment. For example, $$L_{13,1}^6 = \log p(x_{13}^6|s_1) \quad (5)$$

which is the log-likelihood of a length k=6 segment, is broken into 6 equal terms, each equal to $\frac{1}{6}L_{13,1}^6$ which, if added up are equal to $L_{13,1}^6$. Each of the terms is assumed to be the log-likelihood of one of the 6 T-sample segments contained within the segment. We call these "partial PDF values" because they are not actual PDF (likelihood function) values, and only have a physical meaning when added up across a full segment.

If we consider all the segment likelihood values $L_{u,s}^K$ that need to be calculated, we have one for each segment size, at each delay, and for each signal subclass. We then need to expand this number further because each likelihood value appears in K partial PDF values. It can be seen that there is a partial PDF value for each wait state at each incremental time step. If we let $N_{tot}$ be the total number of wait states, we have a partial PDF matrix of $N_{tot}$ wait states by N time steps. The previous example (table 2) has 63 wait states.

The result of the last modification is to create what appears to be the state likelihood values for a standard HMM operating with $N_{tot}$ states on a T-sample regular time update. Let $\pi_w^e$ be the length-$N_{tot}$ prior probabilities and let $A_{w,r}^e$ be the $N_{tot}$ by $N_{tot}$ state transition matrix defined for the expanded state trellis of wait-states (We will explain later how these are obtained). We can, in principle, apply the standard forward procedure, as discussed in Rabiner and previously described, to these log probabilities as though they were an HMM operating at the fine T-sample time resolution. We could also apply the forward-backward procedure to obtain the a posteriori wait-state probabilities $\gamma_{w,t}$, which is the probability that wait state w was in effect at incremental time t, given all the data.

At first glance, it appears that this is not valid because the partial PDF values are not proper observation likelihoods. However, the log-likelihood of the raw data conditioned on knowing the segmentation may be thought of as the accumulation of log-likelihood on the path through the trellis. Because of the dwell-time constraint imposed by the special form of the state transition matrix, any paths through the expanded trellis that accumulate partial PDF values that do not add up to full segments are weighted by a zero probability. So, upon closer inspection the application of the standard HMM forward procedure to the expanded state trellis is indeed a valid algorithm, provided the dwell-time constraints are consistent with the partial PDF values.

Application of the forward procedure as modified herein calculates the probability that a multi-resolution hidden Markov model fits the data. Each of these multi-resolution hidden Markov model is associated with a symbol, word or other information about the associated data. The multi-resolution hidden Markov model having the highest likelihood can be used as the most likely explanation for the received data. Thus, the associated symbol can be given to a user as the most likely interpretation. In a speech recognition application, this symbol could be a word. In a geophysical analysis application this symbol could be an indication of a geological structure. In sonar analysis the symbol could be a ship identification or ship class. This symbol can then be provided to a user or another system for action.

The following provides a discussion of how the forward procedure from the prior art is adapted to MRHMMs. The probability density function (otherwise known as likelihood function) of the raw time-series data given the state path q through the expanded trellis is defined as p(X|q). The forward procedure integrates the PDF over the paths weighted by the probability of the path:

$$L(X) = \sum_{q \in Q} p(X|q)P(q), \quad (6)$$

where Q is the set of all possible paths and P(q) is the probability of a given path q through the trellis. Thus, the MRHMM will obtain this integrated likelihood function, which is useful for classification purposes. The integrated likelihood function that the MRHMM computes represents a true probability based on several different signal analysis window sizes and feature sets. To classify a signal X, the value L(X) is determined for a variety of MRHMM models, and the winning model is chosen. In addition, it is often useful to know additional information about the data. The most likely segmentation (path through the trellis) is often indicative of which types of sub-classes are contained in the data and exactly when they occur. This can be determined by straightforward application of the Viterbi procedure also described by Rabiner. Finally, it is often important to know the relative a posteriori probability of each state at any time step. This is a by-product of the forward-backward procedure outlined in Rabiner. The natural output of applying the forward-backward procedure to the expanded state trellis is the a posteriori wait-state probabilities $\gamma_{w,t}$, which is the probability of being in wait state w at time step t. This probability can be compressed by adding up the probabilities of all wait states and all partitions of a given signal subclass m, to arrive at the quantity $\gamma_{m,t}$ which is the probability of being in signal subclass m at time step t.

Another improvement can be made to the method of calculating conditional likelihood functions. We previously gave an example of the calculation of the total likelihood for a given path L(X|q). We described how L(X|q) is made up of the sum of the likelihood values of the segments that constitute path q, for example $L(X|q)=L_{1,2}^{12}+L_{13,1}^{6}+L_{19,1}^{3}+L_{22,3}^{3}+L_{25,1}^{12}$. A problem that often occurs in the field is the issue of over-parameterization. This is the phenomenon by which the total likelihood function always increases as we break the data up into more parts and assign more parameters to describe the data. The negative aspect of this effect is that when we compare two paths based on their likelihood values alone, the one with more segments (and therefore more parameters, i.e. extracted feature values) is more likely to win the comparison. This is a well-studied problem called model order selection.

Model order selection is not a problem with ordinary hidden Markov models because ordinary hidden Markov models use the same features and segment sizes. In the model comparison field, different models can be compared by assigning a penalty function to the likelihood values depending on the number of parameters (total dimension of the extracted feature values). One known penalty function is the minimum description length (MDL) penalty which equals $$-\frac{p}{2}\log(N)$$

where p is the number of parameters and N is the number of data samples. This can be applied to MRHMM as follows. If the feature set for a length K segment assuming subclass m has p features we subtract $$\frac{p}{2k}\log(K_{max}T)$$

from the partial PDF value $$\frac{1}{k}L_{t,m}^{K}$$

where $K_{max}$ is the largest segment size for the MRHMM. By using this value, then whenever we compare segmentations across any stretch of $T*K_{max}$ samples, the total MDL correction obtained by summing up the partial PDF values along any valid path in the trellis will equal $$-\frac{1}{2}\log(K_{max}T)$$

times the total number of parameters represented by that path. With this MDL correction, the tendency is for the MRHMM to prefer the segmentation and parameterization that is best suited to the data.

The described method requires further modifications for efficient calculation. The number of wait states in the expanded hidden Markov model problem can be very large. The forward and backward procedures have a complexity of the order of the square of the number of states. Thus, an efficient implementation of the forward and backward procedures and Baum-Welch algorithm may be needed that takes advantage of the redundancies in the expanded problem. With some thought, it is not difficult to program the forward and backward procedures so as not to explicitly increment each wait state and not to require the availability of the partial PDF values, relying only on the full segment PDF values. We have obtained a processing time reduction factor of 42 with a problem that had 9 states and expanded to 274 wait states. The two algorithms were tested to produce the same results within machine precision.

Training the MRHMM in order to arrive at a set of parameters is another problem resolved by this method. These parameters include the state transition matrix probabilities and the parameters of the feature PDFs. One method of training a standard hidden Markov model is accomplished by the Baum Welch re-estimation algorithm, which is a special case of an expectation-maximization (EM) algorithm. The part of the Baum Welch algorithm that re-estimates the state probability density functions is simply a weighted maximum likelihood update. That is, it attempts to maximize the weighted log-likelihood function of each state. The weight changes at each time update and is equal to $\gamma_{m,t}$, the a posteriori probability (given all the data) that signal subclass m is in effect at time t. The values of $\gamma_{m,t}$ are obtained as explained above. The re-estimation of the parameters of the segment feature likelihood functions $\log p(z_t^K|m)$ follows the procedure outlined in Rabiner for the standard HMM. Only a slight modification to the standard re-estimation procedure is required. The modification is necessary because there is a segment likelihood function for each segment size associated with signal subclass m. If $\gamma_{m,t}$ indicates that signal subclass m is likely to be present at time t, this does not necessarily mean that all segment sizes associated with signal subclass m are likely. For example, if we are near the end of the probable dwell time in signal subclass m, it is not likely that a large segment could be starting. To account for this issue, the feature $z_{t,m}^K$ is weighted by the smallest value of $\gamma_{m,t}$ within the range of times t that span the segment from which $z_{u,m}^K$ was obtained. This process we call "ganging" because we effectively gang together the training of all the segment sizes associated with signal subclass m.

In summary, one basic method of developing a multi-resolution hidden Markov Model using class specific features is provided. During a definitional phase, one must enumerate the subclasses m. An elemental segment size T, the finest subdivision of data, must be chosen. (This elemental segment size can be based on classification needs or physical system constraints such as processing speed or memory capacity).

In continuing to develop the hidden Markov models, there is an initialization phase. Let $A^e$ be the expanded state transition matrix incorporating wait states. While in principal it is possible to estimate $A^e$ using the standard Baum-Welch algorithm applied to the expanded trellis, it requires a large number of parameters to estimate. One way to reduce the number of parameters to estimate is to base the expanded state transition matrix on a hypothesized M-by-M elemental transition matrix $A_{i,j}$ based on the transition of signal subclasses at the elemental segment rate. $A_{w,r}^e$ is then created from A by the following method. If the wait state of interest, w, is not the last wait state in a partition, then $A_{w,w+1}^e=1$. For each subclass pair i, j where i≠j, let w be the last wait state of any partition corresponding to signal subclass i and let w' be the first wait state of a partition corresponding to signal subclass j that has an entry flag of 1. In this case, we let $A_{w,w'}^e=A_{i,j}$. For each signal subclass i, let w be the last wait state of any partition corresponding to signal subclass i and let w' be the first wait state of any partition also corresponding to subclass i. We let $A_{w,w'}^e=\alpha_m A_{i,i}$, where index m runs over partitions corresponding to subclass i. In order that $A^e$ is a proper state transition matrix, we need that $$\sum_m \alpha_m = 1.$$

Experience has taught that it is best to weight proportional to the partition size.

State prior probabilities must also be initialized. $\pi_i$ is the subclass prior probability, and $\pi_w^e$ is the expanded state prior probability function. When wait state w is the first wait state of partition corresponding to signal subclass I (with a non-zero entry flag), then $\pi_w^e=\pi_i$. Feature probability density functions can be initialized utilizing training data from each subclass.

What is claimed is:

1. A method for classifying data in a signal processing system by determining a best model for classifying data comprising:
   receiving acoustic data from a one dimensional data source;
   selecting an elemental segment size as a finest subdivision of the data;
   selecting features that are representative of possible subclasses of the data in a signal processing system;
   selecting resolution widths for analysis windows based on selected features as multiples of the elemental segment size;
   developing models based on all selected subclasses and resolution widths, each model being associated with a particular symbol;
   comparing the data with each model to give a likelihood that the data fall within the developed model;
   determining the best model from the developed models for the data from a largest likelihood from the step of comparing; and
   providing a signal related to the symbol associated with the determined best model for the data.

2. The method of claim 1 wherein said step of developing models comprises:
   calculating segment likelihood functions from selected features and resolution widths for each subclass;
   calculating comparable probability density functions from segment likelihood functions by utilizing the probability density function projection theorem;
   constraining transitions between subclasses by adding wait states;
   forming partial probability density functions for each wait state from said comparable probability density functions; and
   utilizing said partial probability density functions as said developed model.

3. The method of claim 2 wherein said step of constraining transitions comprises:
   developing an elemental transition matrix containing the probabilities of transitioning from one subclass to the next subclass;
   expanding the elemental transition matrix by incorporating wait states; and
   utilizing the expanded elemental transition matrix to provide the constrained state transitions.

4. The method of claim 2 further comprising correcting said partial probability density functions by subtracting a minimum description length penalty from the value of the partial probability density function.

5. The method of claim 4 wherein said minimum description length penalty is calculated according to:

$$\frac{p}{2k}\log(K_{max}T)$$

wherein
   $K_{max}$ is a largest resolution width,
   p is the number of parameters for the selected features,
   k is the length of a particular segment, and
   T is the elemental segment size.

6. The method of claim 1 wherein said received data is acoustic data, and the developed models are for classes of acoustic signals.

7. The method of claim 6 wherein the subclasses are phonemes.

8. The method of claim 7 wherein the particular symbols are words.

9. The method of claim 6 wherein the classes are acoustic signals from types of underwater sound sources.

10. The method of claim 9 wherein the classes of underwater sound sources comprise manmade and natural sources.

11. The method of claim 1 further comprising the step of providing a signal related the likelihood associated with the symbol associated with the determined best model.

12. The method of claim 11 further comprising the step of providing a signal related to the symbol and likelihood for at least one other model.

13. A method for classifying data by determining a best model for classifying acoustic data comprising:
   receiving data from an acoustic data source;
   selecting an elemental segment size as a finest subdivision of the acoustic data;
   selecting features that are representative of possible subclasses of the acoustic data;
   selecting resolution widths for analysis windows based on selected features as multiples of the elemental segment size;
   developing models in a signal processing system based on all selected subclasses and resolution widths, each model being associated with a particular symbol, said developed models being for classes of acoustic signals;
   comparing the acoustic data with each model to give a likelihood that the acoustic data fall within the developed model;

determining the best model from the developed models for the acoustic data from a largest likelihood from the step of comparing; and providing a signal related to the symbol associated with the determined best model for the acoustic data.

14. The method of claim 13 wherein said step of developing models comprises:

calculating segment likelihood functions from selected features and resolution widths for each subclass;

calculating comparable probability density functions from segment likelihood functions by utilizing the probability density function projection theorem;

constraining transitions between subclasses by adding wait states;

forming partial probability density functions for each wait state from said comparable probability density functions; and utilizing said partial probability density functions as said developed model.

15. The method of claim 14 wherein said step of constraining transitions comprises:

developing an elemental transition matrix containing the probabilities of transitioning from one subclass to the next subclass;

expanding the elemental transition matrix by incorporating wait states; and utilizing the expanded elemental transition matrix to provide the constrained state transitions.

16. The method of claim 14 further comprising correcting said partial probability density functions by subtracting a minimum description length penalty from the value of the partial probability density function.

17. The method of claim 16 wherein said minimum description length penalty is calculated according to:

$$\frac{p}{2k}\log(K_{max}T)$$

wherein $K_{max}$ is a largest resolution width, p is the number of parameters for the selected features, k is the length of a particular segment, and T is the elemental segment size.

18. The method of claim 13 further comprising the step of providing a signal related the likelihood associated with the symbol associated with the determined best model.

19. The method of claim 18 further comprising the step of providing a signal related to the symbol and likelihood for at least one other model.

20. The method of claim 13 wherein said acoustic data source is an acoustic speech data source.

* * * * *